US00RE50195E

(19) United States
(12) Reissued Patent
Accettura et al.

(10) Patent Number: US RE50,195 E
(45) Date of Reissued Patent: Oct. 29, 2024

(54) SYSTEMS, METHODS, AND STORAGE MEDIA FOR MANAGING TRAFFIC ON A DIGITAL CONTENT DELIVERY NETWORK

(71) Applicant: CBS Interactive Inc., San Francisco, CA (US)

(72) Inventors: Robert Accettura, San Francisco, CA (US); Shimon Schwartz, San Francisco, CA (US)

(73) Assignee: CBS Interactive Inc., San Francisco, CA (US)

(21) Appl. No.: 17/728,438

(22) Filed: Apr. 25, 2022

Related U.S. Patent Documents

Reissue of:
(64) Patent No.: 10,972,577
Issued: Apr. 6, 2021
Appl. No.: 16/747,579
Filed: Jan. 21, 2020

(51) Int. Cl.

| | |
|---|---|
| ***H04L 29/08*** | (2006.01) |
| ***H04L 12/841*** | (2013.01) |
| ***H04L 47/28*** | (2022.01) |
| ***H04L 67/10*** | (2022.01) |
| ***H04L 67/5682*** | (2022.01) |

(52) U.S. Cl.
CPC ..... *H04L 67/5682* (2022.05); *H04L 47/286* (2013.01); *H04L 67/10* (2013.01)

(58) Field of Classification Search
CPC .... H04L 67/10; H04L 67/5682; H04L 47/286
See application file for complete search history.

(56) References Cited

U.S. PATENT DOCUMENTS 10,574,772 B2 * 2/2020 Lee ..... H04L 67/2814
2004/0107319 A1 * 6/2004 D'Orto ..... G06F 16/9574 711/133
2012/0110110 A1 * 5/2012 Luna ..... G06F 12/0888 709/213
2015/0169470 A1 * 6/2015 Newlin ..... G06F 12/122 709/203
2015/0256583 A1 * 9/2015 Rosenzweig ..... H04L 65/65 709/219
2015/0319261 A1 * 11/2015 Lonas ..... G06F 12/0875 709/216
2016/0337426 A1 * 11/2016 Shribman ..... H04N 21/6125
2019/0306265 A1 * 10/2019 Håkansson ..... H04L 67/1044
2019/0311430 A1 * 10/2019 Raleigh ..... G06Q 40/03

FOREIGN PATENT DOCUMENTS

WO 2019/042298 A1 3/2019

OTHER PUBLICATIONS

EP21152389.9 Extended European Search Report dated Mar. 3, 2021.

* cited by examiner

*Primary Examiner* — Joshua D Campbell
(74) *Attorney, Agent, or Firm* — Rimon PC; Marc S. Kaufman

(57) ABSTRACT

Systems, methods, and storage media for managing traffic on a digital content delivery network are disclosed. Exemplary implementations may: receive an item of digital content on a digital content delivery network; assign a type category to the item of digital content; determine an update time variable of the item of digital content; determine a cache time for the item of digital content based on the type category of the item of digital content and the update time variable of the item of digital content and; and cache an instance of the item of digital content in a cache memory associated with the content delivery network for the cache time and removing the instance from the cache memory after the cache time has lapsed.

15 Claims, 3 Drawing Sheets

SYSTEMS, METHODS, AND STORAGE MEDIA FOR MANAGING TRAFFIC ON A DIGITAL CONTENT DELIVERY NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE DISCLOSURE

The present disclosure relates to systems, methods, and storage media for managing traffic on a digital content delivery network.

BACKGROUND

A content delivery network (CDN) is a system of distributed network servers that deliver digital content to a user device. The closer a CDN server is to the user geographically and/or from a networking bandwidth perspective, the faster the content will be delivered to the user. To optimize service a CDN typically will retain, i.e. cache, copies of items of digital content, such as the pages of a website, in a network of proxy servers (referred to as "cache memory servers" herein) that are dispersed at geographically different locations. When a user requests an item of digital content that is managed and distributed by the CDN, the CDN will locate the cached content and deliver the cached content. CDNs will also communicate with the originating server to deliver any content that is not currently cached.

To provide efficient content delivery, the CDN attempts to cache content temporarily in cache memory servers that are likely to be closest to the requesting device or otherwise can deliver the content in the most efficient manner. Therefore, CDNs can reduce latency and bandwidth consumption in a computer network environment.

However, as compared to all content being managed by a typical CDN, the available cache memory is limited and thus content is only cached where and when it is anticipated as being needed. Typically, this is managed by use of "Time To Live" (TTL) which serves to tell the cache memory server how long it should keep an item of content in its cache. Much content, such as many web pages, are static preformatted files that are not expected to be updated often over time. It is relatively simple to cache such static content by observing where requests come from for specified content and how often the requests for the content are made. The TTL can be set in accordance with the following considerations:

- The higher the TTL, the less frequently caching servers need to query original source of content;
- A higher TTL reduces the perceived latency of a site and decreases the dependency on the original source of the content;
- The lower the TTL, the sooner the cached record expires—this allows queries for the content to occur more frequently.

When a CDN manages many different types of content, especially dynamic content, such as breaking news reports and blogs, managing service using TTL can become very complicated and less effective. It is known to set the TTL based on the type of content. However, this still falls short of optimizing cached content in a manner that effectively reduces latency and bandwidth needs of a CDN.

SUMMARY

One aspect of the present disclosure relates to a system configured for managing traffic on a digital content delivery network. The system may include one or more hardware processors configured by machine-readable instructions. The processor(s) may be configured to receive an item of digital content on a digital content delivery network. The processor(s) may be configured to assign a type category to the item of digital content. The processor(s) may be configured to determine an update time variable of the item of digital content. The processor(s) may be configured to determine a cache time for the item of digital content based on the type category of the item of digital content and the update time variable of the item of digital content and. The processor(s) may be configured to cache an instance of the item of digital content in a cache memory associated with the content delivery network for the cache time and removing the instance from the cache memory after the cache time has lapsed.

Another aspect of the present disclosure relates to a method for managing traffic on a digital content delivery network. The method may include receiving an item of digital content on a digital content delivery network. The method may include assigning a type category to the item of digital content. The method may include determining an update time variable of the item of digital content. The method may include determining a cache time for the item of digital content based on the type category of the item of digital content and the update time variable of the item of digital content and. The method may include caching an instance of the item of digital content in a cache memory associated with the content delivery network for the cache time and removing the instance from the cache memory after the cache time has lapsed.

Yet another aspect of the present disclosure relates to a non-transient computer-readable storage medium having instructions embodied thereon, the instructions being executable by one or more processors to perform a method for managing traffic on a digital content delivery network. The method may include receiving an item of digital content on a digital content delivery network. The method may include assigning a type category to the item of digital content. The method may include determining an update time variable of the item of digital content. The method may include determining a cache time for the item of digital content based on the type category of the item of digital content and the update time variable of the item of digital content and. The method may include caching an instance of the item of digital content in a cache memory associated with the content delivery network for the cache time and removing the instance from the cache memory after the cache time has lapsed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Implementations described herein dynamically determine cache times in a flexible manner. The implementations can be based on the premise that content is updated most frequently when it is new content and/or when updates to the content are accomplished in batches. For example, a new breaking news item is likely to be updated frequently as more information becomes available and the story establishes itself. Thus, such an item can have a relatively short cache time to conserve computing resources. As the facts of the story come out over time, the news item is likely to be updated less frequently and can have an increased cache time. A cache time setting algorithm takes into account the "newness" of the item of content and the type of the item of content to dynamically set cache times. For example, a new item of content or one that has just been updated might be cached for 120 seconds. This time might be increased to 180 seconds if the item of content lasts more than, for example, 10 minutes without an update. The result is that content that is likely to be updated frequently (highly dynamic content) will be cached for shorter periods of time to balance network loads with the desire to have the most recent version of content.

Figure 1:
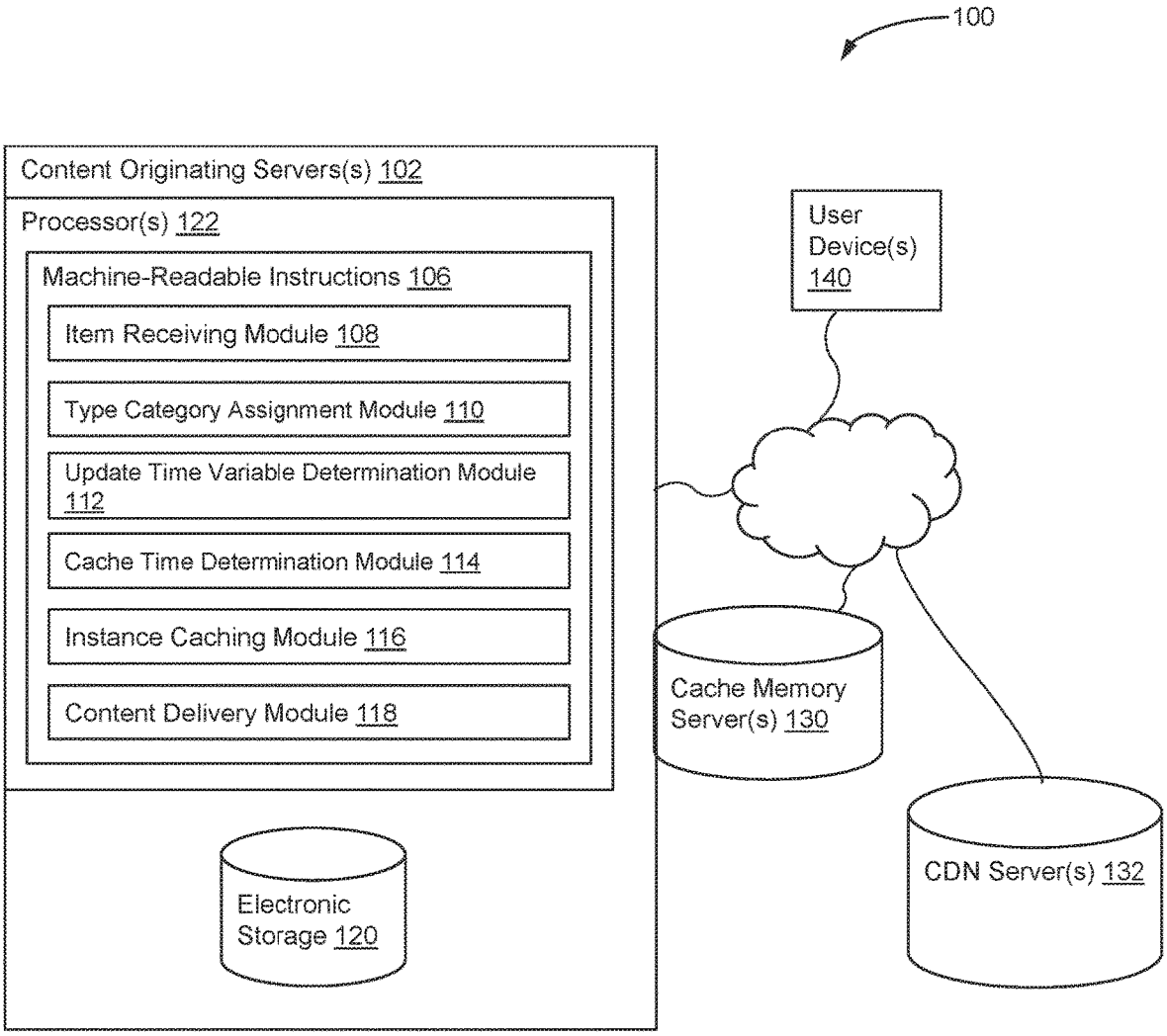
FIG. 1 illustrates a system architecture configured for managing traffic on a digital content delivery network, in accordance with one or more implementations.

FIG. 1 illustrates a system 100 configured for applying dynamic content cache time algorithms for managing traffic on a digital content delivery network in accordance with one or more implementations. In some implementations, system 100 may include one or more Content Origination Servers 102. Content Origination Server(s) 102 may be configured to communicate with one or more cache memory servers 130, CDN servers 132 and user devices 140 according to a client/server architecture and/or other architectures. Users may access system 100 via client computing platform(s) 104.

Content Origination Server(s) 102 may be configured by machine-readable instructions 106. Machine-readable instructions 106 may include one or more instruction modules. The instruction modules may include computer program modules. The instruction modules may include one or more of item receiving module 108, type category assignment module 110, update time variable determination module 112, cache time determination module 114, instance caching module 116, content delivery module 118 and/or other instruction modules.

Item receiving module 108 may be configured to receive an item of digital content from a digital content delivery network. Receiving the content can include actually receiving a file of the content from CDN 132 and/or receiving information relating to the content, such as an address at which the content is stored, the type of the content (such as breaking news, blogs, web page, . . . ) the file size of the content, and other information describing the content.

Type category assignment module 110 may be configured to assign a type category to the item of digital content. The type category can be assigned based on the type information, other metadata, and/or analysis of the content.

Update time variable determination module 112 may be configured to determine an update time variable of the item of digital content. For example, the update time variable may be at least one of the most recent update time of the item of digital content or any other indicator or update timing/frequency.

Cache time determination module 114 may be configured to dynamically determine a cache time, specified as a TTL for example, for the item of digital content based on the type category of the item of digital content and the update time variable of the item of digital content. Determining a cache time may include applying a rule to determine the cache time. The rule may include multiple time periods that are each respectively associated with a corresponding time variable and wherein a time period is selected as the cache time based on the time period corresponding to the time variable in the rule. A specific example of a rule is set forth below. The type category may have a corresponding offset and determining the cache time further includes multiplying the selected time period by the offset corresponding to the type category of the item of digital content.

Instance caching module 116 may be configured to cache cause an instance of the item of digital content to be cached in a memory of one or more cache memory servers 130 associated with the content delivery network for the cache time. The instance can be removed from the cache memory after the cache time has lapsed. Content delivery module 118 may be configured to respond to a request for an item of content and cause the item of content to be delivered to a user device 140 from an appropriate cache memory server 130 or a CDN server 132. Instance caching module 116 and content delivery module 118 are shown in FIG. 1 as being part of content originating servers 102. However, these modules can part of the CDN Network. Further, cache memory servers 130 can be integral to the content originating servers 102.

In one implementation, the cache time is determined on content originating server 102 and sent, as a TTL for example, to the CDN layer. Alternatively, the cache time can be determined in the CDN layer. In such a case, the all or part of the content originating server(s) 102 can be integrated with the CDN layer. Examples of CDN decisioning could be based on a user-agent (such as a google bot) or a geographic location or connection type of the client device. For example, a mobile connection may have higher TTL to save on data costs for end user by having lower latency or mobile user has this page already cached return a 304 Not Modified response header to save on bandwidth.

The steps of determining an update time variable, determining a cache time and caching the item of digital content may be repeated periodically based on a trigger event. The trigger event may be at least one of the passage of a predetermined time interval and/or an update of the item of digital content. By way of non-limiting example, the update frequency of the item of digital, editorial attention given to the item of digital content, the time of day, the location of the specific cache memory server 130, expected network traffic for the item of digital content, and/or actual traffic monitored for the item of digital content may be used to determine the update time variable.

In some implementations, server(s) 102, client computing platform(s) 104, and/or external resources 118 may be operatively linked via one or more electronic communication links. For example, such electronic communication links may be established, at least in part, via a network such as the Internet and/or other networks. A given user device 140 may include one or more processors configured to execute computer program modules. The computer program modules may be configured to enable a user associated with the given user device 140 to interface with other elements of system 100, and/or provide other functionality. By way of non-limiting example, the given user device 140 may include one or more of a desktop computer, a laptop computer, a handheld computer, a tablet computing platform, a SmartTV, a Smartphone, a gaming console, and/or other computing platforms.

Content Origination Server(s) 102, may include electronic storage 120, one or more processors 122, and/or other components. Server(s) 102 may include communication lines, or ports to enable the exchange of information with a network and/or other computing platforms. Illustration of Content Origination Server(s) 102 in FIG. 1 is not intended to be limiting. Content Origination Server(s) 102 may include a plurality of hardware, software, and/or firmware components operating together to provide the functionality attributed herein to server(s) 102. For example, Content Origination Server(s) 102 may be implemented by a cloud of distributed computing platforms operating together as server (s) 102.

Cache memory servers 130 and CDN servers 132 may also include electronic storage, one or more processors, and/or other components. These devices may include communication lines, or ports to enable the exchange of information with a network and/or other computing platforms. Illustration of cache memory servers 130 and content CDN 132 in FIG. 1 is not intended to be limiting. Cache memory servers 130 and CDN servers 132 may include a plurality of hardware, software, and/or firmware components operating together to provide the functionality attributed herein to these devices. For example, cache memory servers 130 and CDN 132 may be implemented by a cloud of distributed computing platforms.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein. Cache memory servers 130 and CDN servers 132 may have similar memory devices.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor (s) 122 may be configured to execute the modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118 are illustrated in FIG. 1 as being implemented within a single processing unit, in implementations in which processor(s) 122 includes multiple processing units, one or more of modules may be implemented remotely from the other modules. The description of the functionality provided by the different modules is for illustrative purposes, and is not intended to be limiting, as any of the modules may provide functionality or less functionality than is described. For example, one or more of modules may be eliminated, and some or all of its functionality may be provided by other ones of modules.

An example algorithm for determining caching times (by cache time determination module 114, for example) is described below. In this example, the type of the content is used to determine a weighting that adjusts a default time and the time variable is the age of the content item, i.e. the elapsed time since the item was first posted or last updated.

Apply a cache offset weighting based on the type of the content item;

The offset weighting can be a non-zero number that is less than or equal to 1 (default can be 1), for example:

Live blog=0.5

Breaking news=0.3

Static web page=1.0

Apply rule conditions based on content item age and corresponding cache time (use the largest corresponding age);

If age <=300 seconds, cache for 2×w minutes

If age <=600 seconds, cache for 3×w minutes

If age <=900 seconds, cache for 4×w minutes

In the example above, a live blog item of content that was last updated 500 seconds ago will have an offset weighting of 0.5 and a cache time of 3×0.5=1.5 minutes. If the item of content were a static web page, cache time would be 3×1.0=3 minutes.

Figure 2:
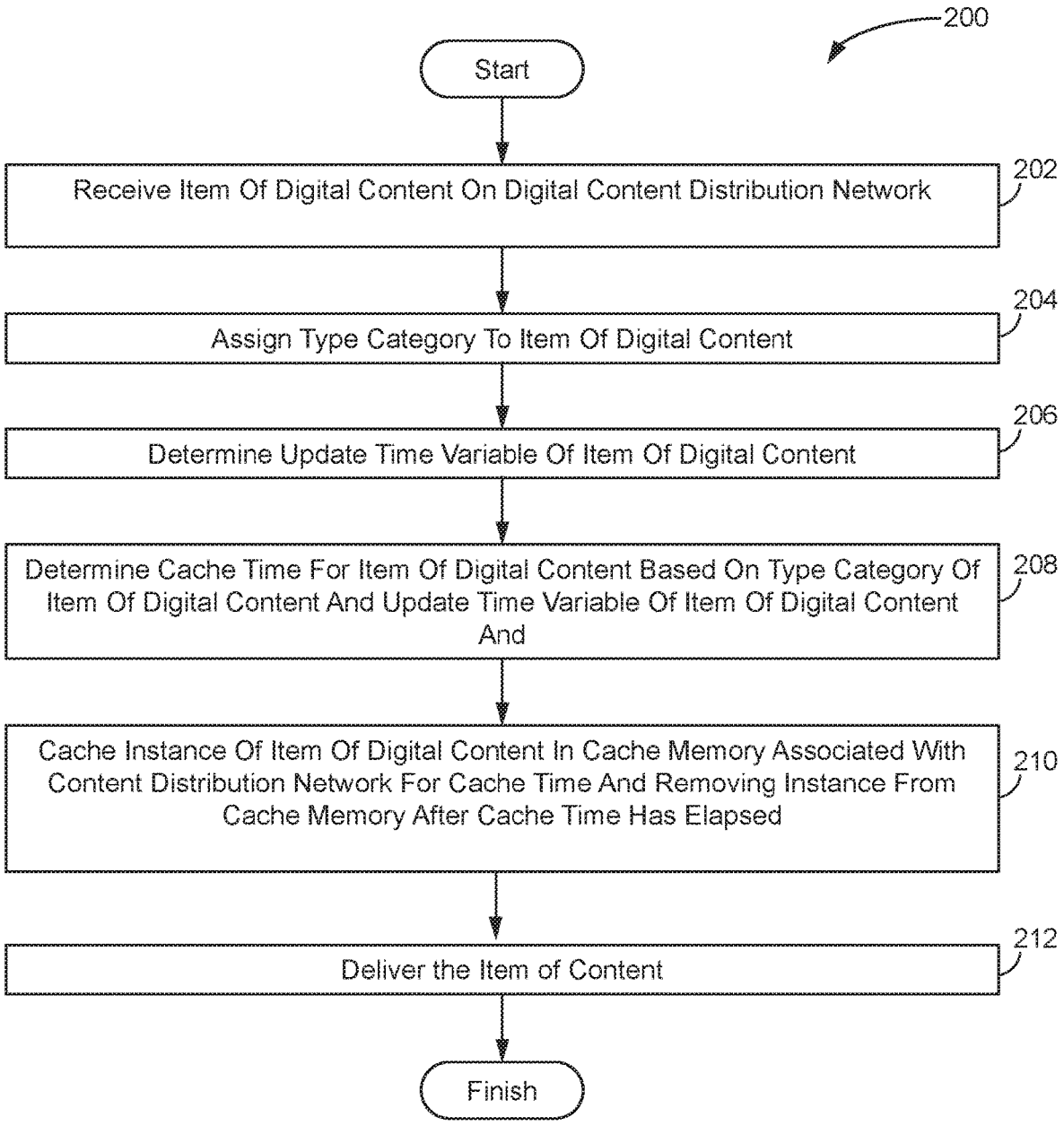
FIG. 2 illustrates a method for managing traffic on a digital content delivery network, in accordance with one or more implementations.

FIG. 2 illustrates a method 200 for managing traffic on a digital content delivery network by dynamically adjusting cache timing, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. As an example, method 200 can be implemented by a computing platform such as the system of FIG. 1.

An operation 202 may include receiving an item of digital content on a digital content delivery network. Operation 202 may be performed by one or more hardware processors configured by machine-readable instructions including a module that is the same as or similar to item receiving module 108, in accordance with one or more implementations.

An operation 204 may include assigning a type category to the item of digital content. Operation 204 may be performed by one or more hardware processors configured by machine-readable instructions including a module that is the same as or similar to type category assignment module 110, in accordance with one or more implementations.

An operation 206 may include determining an update time variable of the item of digital content. Operation 206 may be performed by one or more hardware processors configured by machine-readable instructions including a module that is the same as or similar to update time variable determination module 112, in accordance with one or more implementations.

An operation 208 may include determining a cache time for the item of digital content based on the type category of the item of digital content and the update time variable of the item of digital content and. Operation 208 may be performed by one or more hardware processors configured by machine-readable instructions including a module that is the same as or similar to cache time determination module 114, in accordance with one or more implementations.

An operation 210 may include caching an instance of the item of digital content in a cache memory associated with the content delivery network for the cache time and removing the instance from the cache memory after the cache time has lapsed. Operation 210 may be performed by one or more hardware processors configured by machine-readable instructions including a module that is the same as or similar to instance caching module 116, in accordance with one or more implementations.

Operation 212 may respond to a request for an item of content and cause the item of content to be delivered to a user device 140 from an appropriate cache memory server 130 or a CDN server 132. Operation 212 may be performed by one or more hardware processors configured by machine-readable instructions including a module that is the same as or similar to content delivery module 118, in accordance with one or more implementations.

Figure 3:
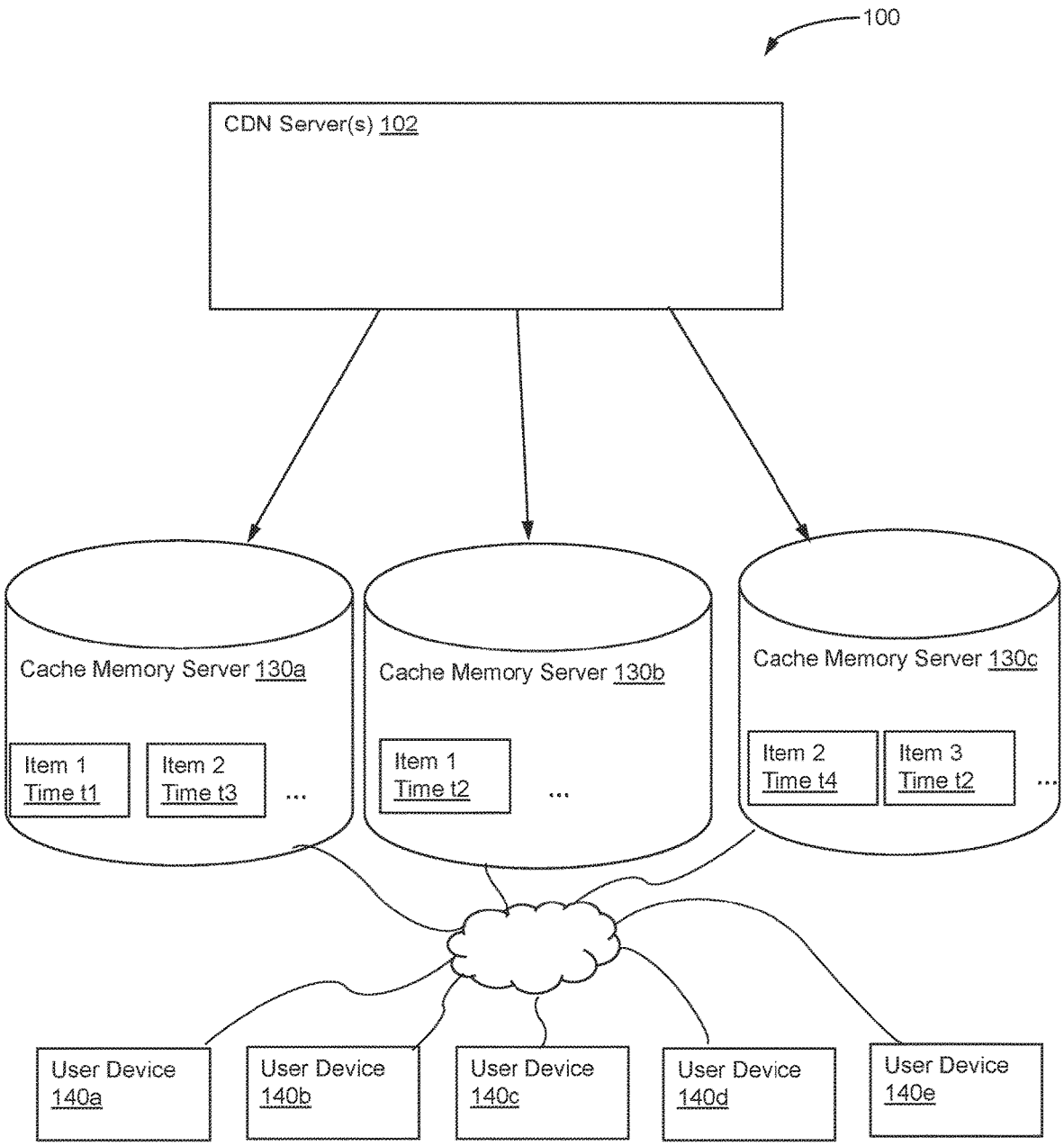
FIG. 3 illustrates the system architecture of FIG. 1 with greater detail in the cache memory servers.

FIG. 3 illustrates the architecture of FIG. 1 in more detail and at a specified time T. In FIG. 3, Content Origination Server(s) 100 can be the same as in FIG. 1. Also, multiple cache memory servers 130a, 130b, and 130c and user devices 140a through 140e are illustrated. Content Origination Server(s) 102 cause items of content to be cached in various cache memory servers 130a, 130b, and 130c as needed. Each content item has a cache time that is determined in the manner described above. Note that, at time T, content item 2 is cached in both cache memory servers 130a and 130c, with different corresponding cache times. This situation can occur when the update time variable and or the offset weighting is based at least in part on the location, or other characteristics, of the cache memory server and/or characteristics of user devices likely to be serviced by the cache memory server. The dynamic determination of cache timing allows maximizing the resources of the cache servers 130 while delivering the most updated content in an efficient manner. This results in superior operation of the site when operated with a CDN.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for managing traffic on a [digital content delivery network] *system of distributed network servers*, the system comprising:

one or more hardware processors configured by machine-readable instructions to:

receive an item of digital content on a [digital content delivery network] *system of distributed network servers*;

assign a type category to the item of digital content;

determine an update time variable of the item of digital content;

determine a cache time for the item of digital content based on the type category of the item of digital content and the update time variable of the item of digital content, wherein the step of determining a cache time comprises applying a rule to determine the cache time, wherein the rule includes multiple time periods that are each respectively associated with a corresponding update time variable and wherein a time period is selected as the cache time based on the time period corresponding to the update time variable of the item of digital content, wherein the rule further includes type categories each having a corresponding offset and the step of determining the cache time further comprises multiplying the selected time period by the offset corresponding to the type category of the item of digital content; and cause an instance of the item of digital content to be cached in a cache memory associated with the [content delivery network] *system of distributed network servers* for the cache time and allowing removal of the instance of the item of digital content from the cache memory after the cache time has lapsed.

2. The system of claim 1, wherein the steps of determining an update time variable, determining a cache time and caching the item of digital content are repeated periodically based on a trigger event.

3. The system of claim 2, wherein the update time variable is at least one of the most recent update time of the item of digital content, the update frequency of the item of digital, editorial attention given to the item of digital content, the time of day, expected network traffic for the item of digital content, and/or actual traffic monitored for the item of digital content.

4. The system of claim 2, wherein the trigger event is at least one of the lapse of a predetermined time interval and/or an update of the item of digital content.

5. The system of claim 1, wherein assigning a type category is based on metadata associated with the item of digital content.

6. A computer implemented method for managing traffic on a [digital content delivery network] *system of distributed network servers*, the method comprising:

receiving an item of digital content on a [digital content delivery network] *system of distributed network servers*;

assigning a type category to the item of digital content;

determining an update time variable of the item of digital content;

determining a cache time for the item of digital content based on the type category of the item of digital content and the update time variable of the item of digital content, wherein the step of determining a cache time comprises applying a rule to determine the cache time, wherein the rule includes multiple time periods that are each respectively associated with a corresponding update time variable and wherein a time period is selected as the cache time based on the time period corresponding to the update time variable of the item of digital content, wherein the rule further includes type categories each having a corresponding offset and the step of determining the cache time further comprises multiplying the selected time period by the offset corresponding to the type category of the item of digital content; and cause an instance of the item of digital content to be cached in a cache memory associated with the [content delivery network] *system of distributed network servers* for the cache time and allowing removal of the instance from the cache memory after the cache time has lapsed.

7. The method of claim 6, wherein the steps of determining an update time variable, determining a cache time and caching the item of digital content are repeated periodically based on a trigger event.

8. The method of claim 7, wherein the update time variable is at least one of the most recent update time of the item of digital content, the update frequency of the item of digital, editorial attention given to the item of digital content, the time of day, expected network traffic for the item of digital content, and/or actual traffic monitored for the item of digital content.

9. The method of claim 7, wherein the trigger event is at least one of the lapse of a predetermined time interval and/or an update of the item of digital content.

10. The method of claim 6, wherein assigning a type category is based on metadata associated with the item of digital content.

11. A non-transient computer-readable storage medium having instructions embodied thereon, the instructions being executable by one or more processors to perform a method for managing traffic on a [digital content delivery network] *system of distributed network servers*, the method comprising:

receiving an item of digital content on a [digital content delivery network] *system of distributed network servers*;

assigning a type category to the item of digital content;

determining an update time variable of the item of digital content;

determining a cache time for the item of digital content based on the type category of the item of digital content and the update time variable of the item of digital content, wherein the step of determining a cache time comprises applying a rule to determine the cache time, wherein the rule includes multiple time periods that are each respectively associated with a corresponding update time variable and wherein a time period is selected as the cache time based on the time period corresponding to the update time variable of the item of digital content, wherein the rule further includes type categories each having a corresponding offset and the step of determining the cache time further comprises multiplying the selected time period by the offset corresponding to the type category of the item of digital contents; and cause an instance of the item of digital content to be cached in a cache memory associated with the [content delivery network] *system of distributed network servers* for the cache time and allowing removal of the instance from the cache memory after the cache time has lapsed.

12. The non-transient computer-readable storage medium of claim 11, wherein the steps of determining an update time variable, determining a cache time and caching the item of digital content are repeated periodically based on a trigger event.

13. The non-transient computer-readable storage medium of claim 12, wherein the update time variable is at least one of the most recent update time of the item of digital content, the update frequency of the item of digital, editorial attention given to the item of digital content, the time of day, expected network traffic for the item of digital content, and/or actual traffic monitored for the item of digital content.

14. The non-transient computer-readable storage medium of claim 12, wherein the trigger event is at least one of the lapse of a predetermined time interval and/or an update of the item of digital content.

15. The non-transient computer-readable storage medium of claim 11, wherein assigning a type category is based on metadata associated with the item of digital content.

* * * * *